United States Patent
Kiryu et al.

[11] Patent Number: 5,575,350
[45] Date of Patent: Nov. 19, 1996

[54] DRIVING FORCE CONTROL SYSTEM IN VEHICLE

[75] Inventors: Hironobu Kiryu; Ryoji Mori; Takashi Nishihara; Shuji Shiraishi, all of Wako, Japan

[73] Assignee: Honda Giken Kogyo Kabushiki Kaisha, Tokyo, Japan

[21] Appl. No.: 405,241

[22] Filed: Mar. 17, 1995

[30] Foreign Application Priority Data

Mar. 18, 1994 [JP] Japan .................................. 6-049192

[51] Int. Cl.$^6$ .................................................. B60K 28/16
[52] U.S. Cl. ...................................... 180/197; 364/426.03
[58] Field of Search ........................ 180/197; 364/424.01, 364/426.01, 426.03; 123/333

[56] References Cited

U.S. PATENT DOCUMENTS

| | | | |
|---|---|---|---|
| 5,193,061 | 3/1993 | Tsuyama et al. | 180/197 X |
| 5,248,010 | 9/1993 | Yagi et al. | 180/197 |
| 5,279,382 | 1/1994 | Iwata | 180/197 |
| 5,390,116 | 2/1995 | Hayafune | 180/197 X |
| 5,410,477 | 4/1995 | Ishii et al. | 364/424.01 |

FOREIGN PATENT DOCUMENTS 5-214974  8/1993  Japan .

*Primary Examiner*—Anne Marie Boehler
*Assistant Examiner*—Victor E. Johnson
*Attorney, Agent, or Firm*—Nikaido, Marmelstein Murray & Oram LLP

[57] ABSTRACT

A system is provided to prevent suspension judder from being generated at the start of a vehicle which includes a traction control system. If the starting of the vehicle is detected based on driving-wheel speeds RL and RR, a shift position and an accelerator opening degree $\theta th1$, an initial torque TQ2 and a delay time are map-searched based on the accelerator opening degree $\theta th1$ and a steering angle $\theta st$. The driving force for driven wheels is limited to the initial torque TQ2, until a delay time from the starting of the vehicle has elapsed, to prevent the generation of suspension judder. When the delay time has elapsed, an accelerating increment torque TQ3 is map-searched based on the accelerator opening degree $\theta th1$ and the steering angle $\theta st$, and is added to the initial torque TQ2, thereby ensuring the accelerating performance of the vehicle.

13 Claims, 6 Drawing Sheets

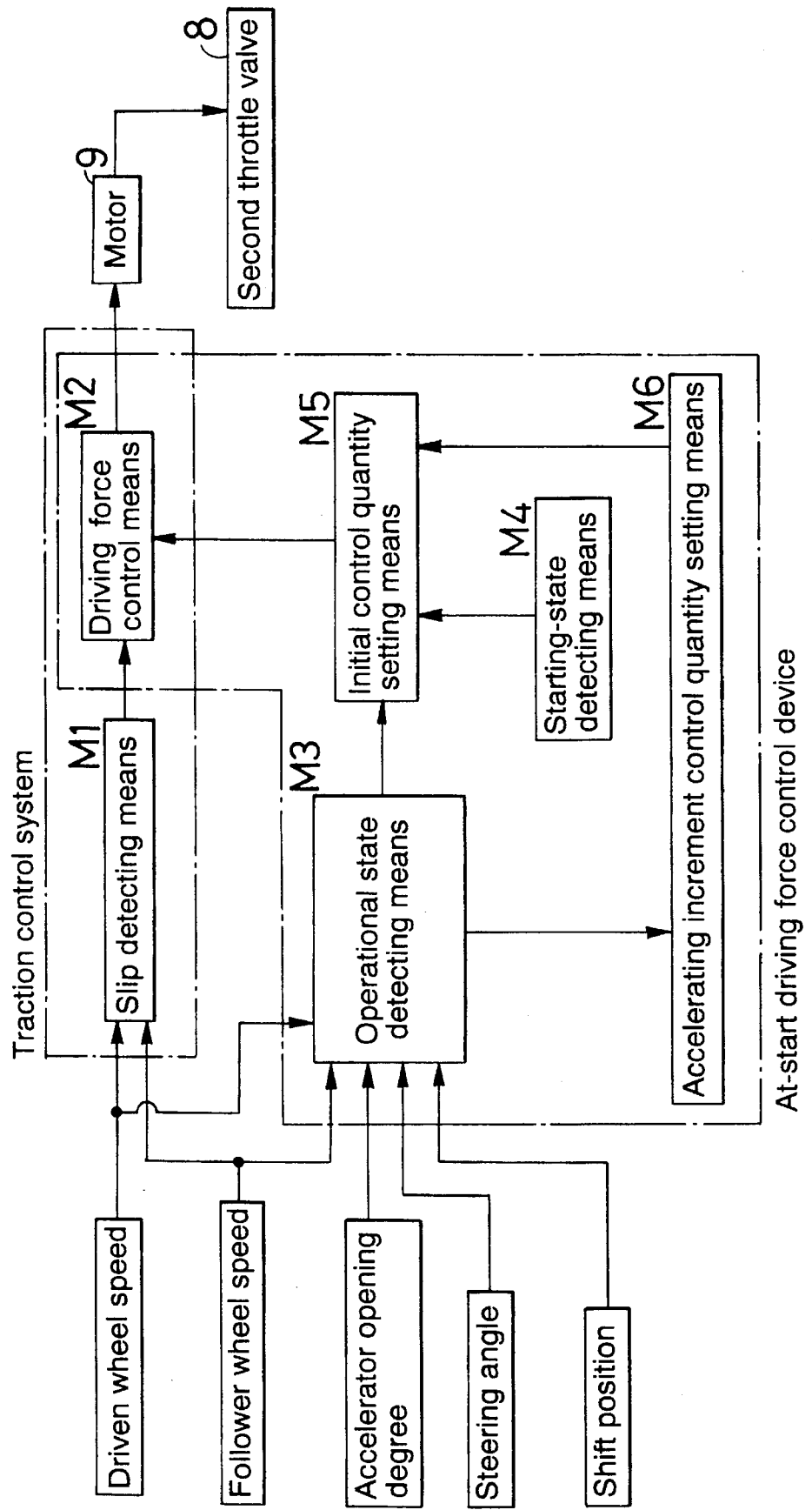

DRIVING FORCE CONTROL SYSTEM IN VEHICLE

BACKGROUND OF THE INVENTION

1. Field of the Invention

The present invention relates to a driving force control system in a vehicle, including a driving force control means for limiting the driving force on a driven wheel to prevent excessive slip of the driven wheel.

2. Description of the Prior Art

Driving force control systems in a vehicle are known as traction control systems, and have already been proposed such as in Japanese Patent Application Laid-Open No. 214974/1993.

Methods for limiting the driving force on the driven wheel in a traction control system generally include a method for reducing the output from an engine and a method for braking the driven wheel using a brake device. The former method includes the control of a throttle valve, the control of ignition timing, the control of the amount of fuel injected or the like.

In a vehicle having a traction control system using tandem throttle valves, a first throttle valve is mechanically connected to and is opened and closed by an accelerator pedal and a second throttle valve is disposed upstream of the first throttle valve and is opened and closed by a control motor. The driving force of the driven wheel is limited by driving the control motor with an electronic control unit to control the opening and closing of the second throttle valve.

In the prior art traction control system, when the driven wheel slips at the start of the vehicle movement and such slipping is continued to a certain extent, the slip rate is rarely maintained constant due to variations in the road surface friction coefficient, a variation in load applied to the tire, a variation in power output from the engine and/or the like and for this reason, a fine vibration is generated. If this vibration is operatively associated with the movement of the vehicle suspension system, a self-induced vibration (suspension judder) of the suspension system may be generated and in some cases provides an uncomfortable feeling to a driver, resulting in reduced riding comfort.

SUMMARY OF THE INVENTION

The present invention has been accomplished with the above circumstance in view, and it is an object of the present invention to prevent the suspension judder at the start of vehicle movement.

To achieve the above object, according to a first aspect and feature of the present invention, there is provided a driving force control system in a vehicle, comprising a slip detecting means for detecting the slip of a driven wheel of a vehicle, and a driving force control means for limiting the driving force of the driven wheel when the slip detecting means detects an excessive slip of the driven wheel. An operational state detecting means detects an operational state of the vehicle; a starting-state detecting means detects a starting state of the vehicle; and an initial control quantity setting means sets an initial control quantity for the driving force at the start of the vehicle in accordance with an output from the operational state detecting means, when it is determined, based on an output from the starting-state detecting means, that the vehicle is in a starting state. The initial control quantity set by the initial control quantity setting means at the start of the vehicle is applied to the driving force control means to limit the driving force for the driven wheel.

In addition to the above feature, the limiting of the driving force for the driven wheels based on the initial control quantity is continued until a predetermined time has elapsed after the start of the vehicle.

The driving force control system further includes an accelerating increment control quantity setting means for setting an accelerating increment control quantity which is added to the initial control quantity when accelerating the vehicle. The accelerating increment control quantity is added to the initial control quantity after the lapse of a predetermined time after the start of the vehicle.

BRIEF DESCRIPTION OF THE DRAWINGS

The present invention will now be described by way of a preferred embodiment in connection with the accompanying drawings.

FIG. 6 is a block diagram of the driving force control system of the present invention.

DETAILED DESCRIPTION OF THE PREFERRED EMBODIMENT

Figure 1:
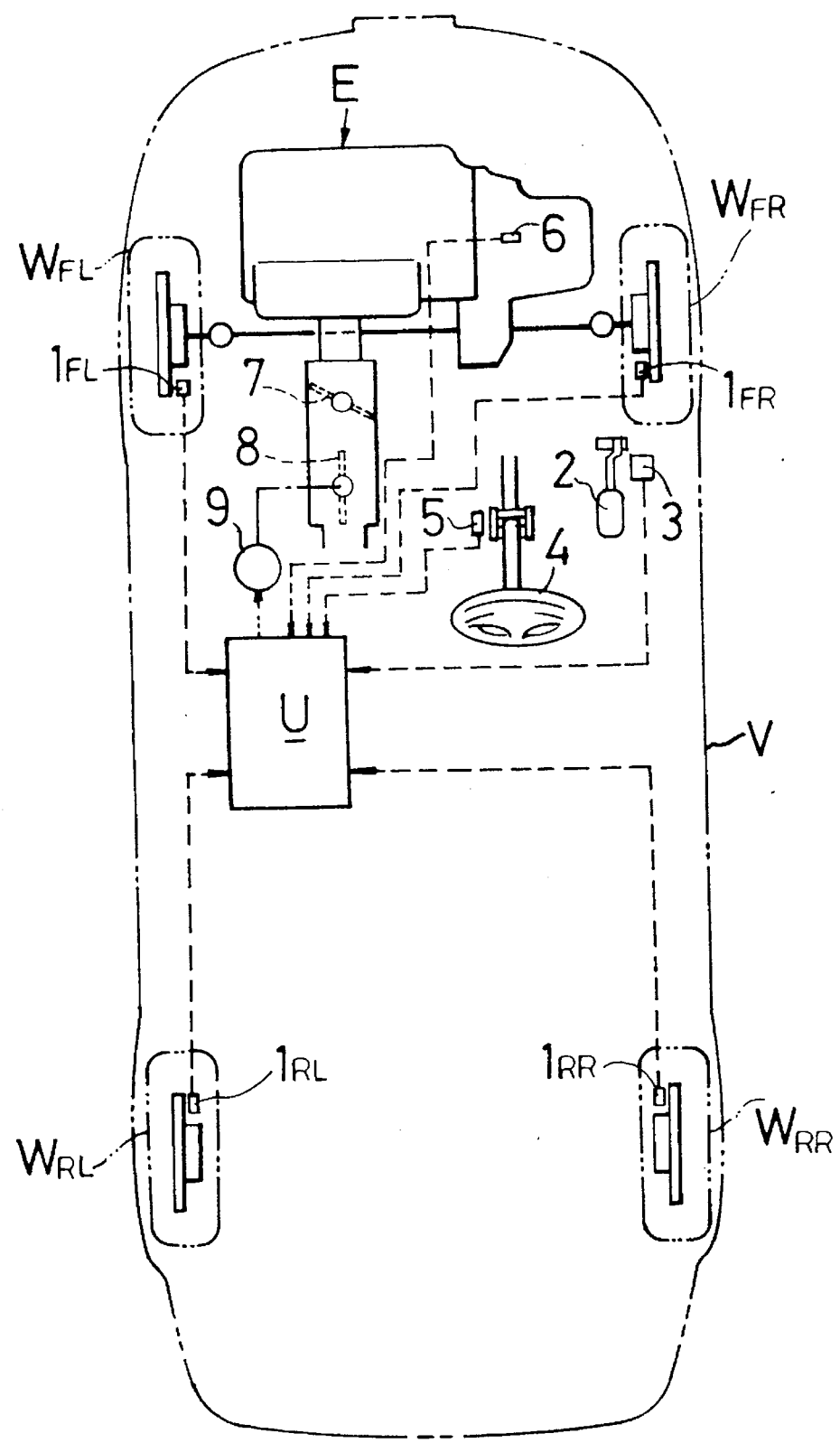
FIG. 1 is a diagrammatic illustration of a vehicle including a driving force control system.

FIG. 1 shows a vehicle V which is a front wheel drive vehicle. The vehicle V includes a pair of left and right driven wheels $W_{FL}$ and $W_{FR}$ driven by an engine E, and a pair of left and right follower wheels $W_{RL}$ and $W_{RR}$ rotated when the vehicle travels. Driven wheel speed sensors $1_{FL}$ and $1_{FR}$ for detecting driven wheel speeds FL and FR, are mounted on the driven wheels $W_{FL}$ and $W_{FR}$, respectively. Follower wheel speed sensors $1_{RL}$ and $1_{RR}$ for detecting follower wheel speeds RL and RR, are mounted on the follower wheels $W_{RL}$ and $W_{RR}$, respectively.

An accelerator opening degree sensor 3 is mounted on an accelerator pedal 2 for detecting an opening degree θth1 of the accelerator pedal 2. A steering angle sensor 5 for detecting a steering angle θst, is mounted on a steering wheel 4. A shift position sensor 6 for detecting a shift position, is mounted on a transmission.

A downstream first throttle valve 7 and an upstream second throttle valve 8 are provided in an intake passage of the engine E. The first throttle valve 7 is mechanically connected to and is opened and closed by the accelerator pedal 2. The second throttle valve 8 is electrically opened and closed by a motor 9.

An electronic control unit U including a microcomputer receives signals from the driven wheel speed sensors $1_{FL}$ and $1_{FR}$, the follower wheel speed sensors $1_{RL}$ and $1_{RR}$, the accelerator opening degree sensor 3, the steering angle sensor 5 and the shift position sensor 6 according to a predetermined program, and controls the operation of the motor 9 which operates the second throttle valve 8.

As shown in FIG. 6, the electronic control unit U includes a well-known traction control system and an at-start driving force control system added to the traction control system.

The traction control system includes a slip detecting means M1 for detecting a slip rate of each of the driven wheels $W_{FL}$ and $W_{FR}$ based on the driven wheel speed FL and FR and the follower wheel speed RL and RR. The traction control system also includes a driving force control means M2 for suppressing an excessive slip by driving the second throttle valve 8 using the motor 9 to reduce the power output from the engine E, when the excessive slip has been generated in the driven wheels $W_{FL}$ and $W_{FR}$. The at-start driving force control device includes: an operational state detecting means M3 for detecting the operational state of the vehicle V based on the driven wheel speeds FL and FR, the follower wheel speeds RL and RR, the accelerator opening degree $\theta th1$, the steering angle $\theta st$ and the shift position; a starting-state detecting means M4 for detecting that the vehicle V is in a starting-state; an initial control quantity setting means M5 for setting an initial torque TQ2 for the driven wheels $W_{FL}$ and $W_{FR}$ based on an output from the operational state detecting means M3 and an output from the starting-state detecting means M4 in order to prevent suspension judder at the start of the vehicle V; an accelerating increment control quantity setting means M6 for setting an accelerating increment torque TQ3 for correcting the initial torque TQ2 to an increased level based on an output from the operational state detecting means M3 in order to insure an acceleratability of the vehicle V after the suspension judder is avoided; and the driving force control means M2.

Figure 3:
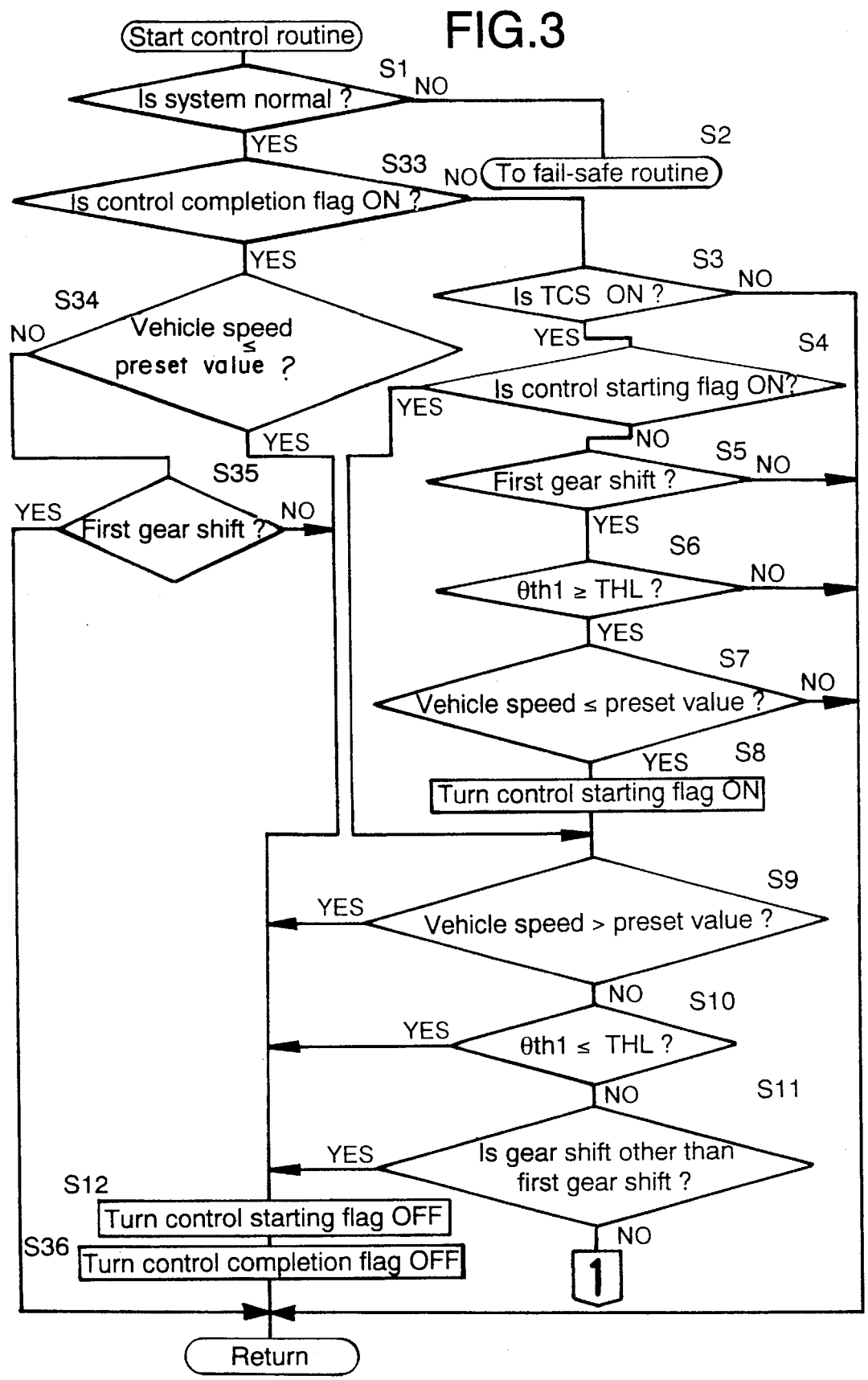
FIG. 3 is a first portion of a flow chart.
Figure 4:
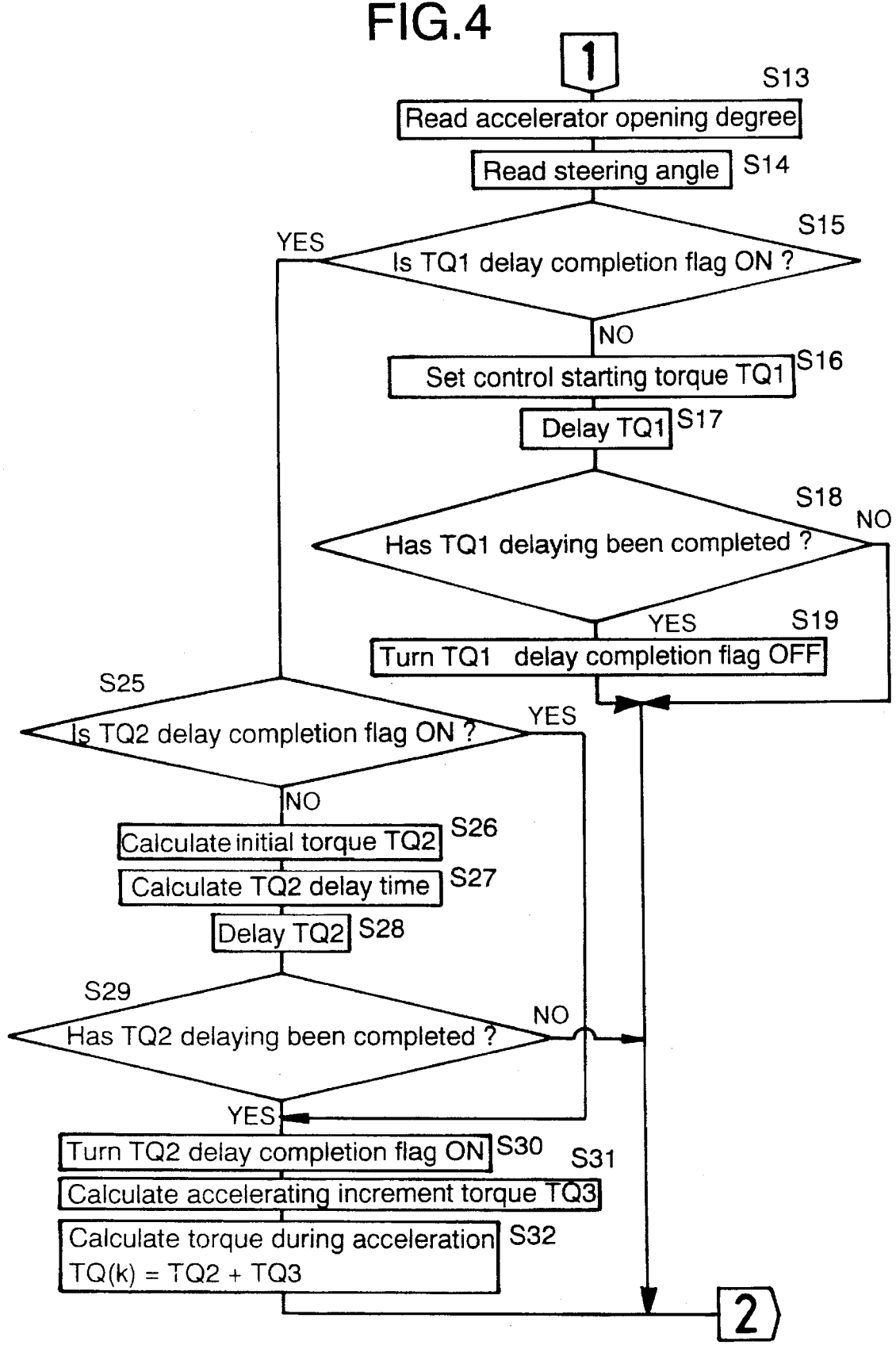
FIG. 4 is a second portion of the flow chart.
Figure 5:
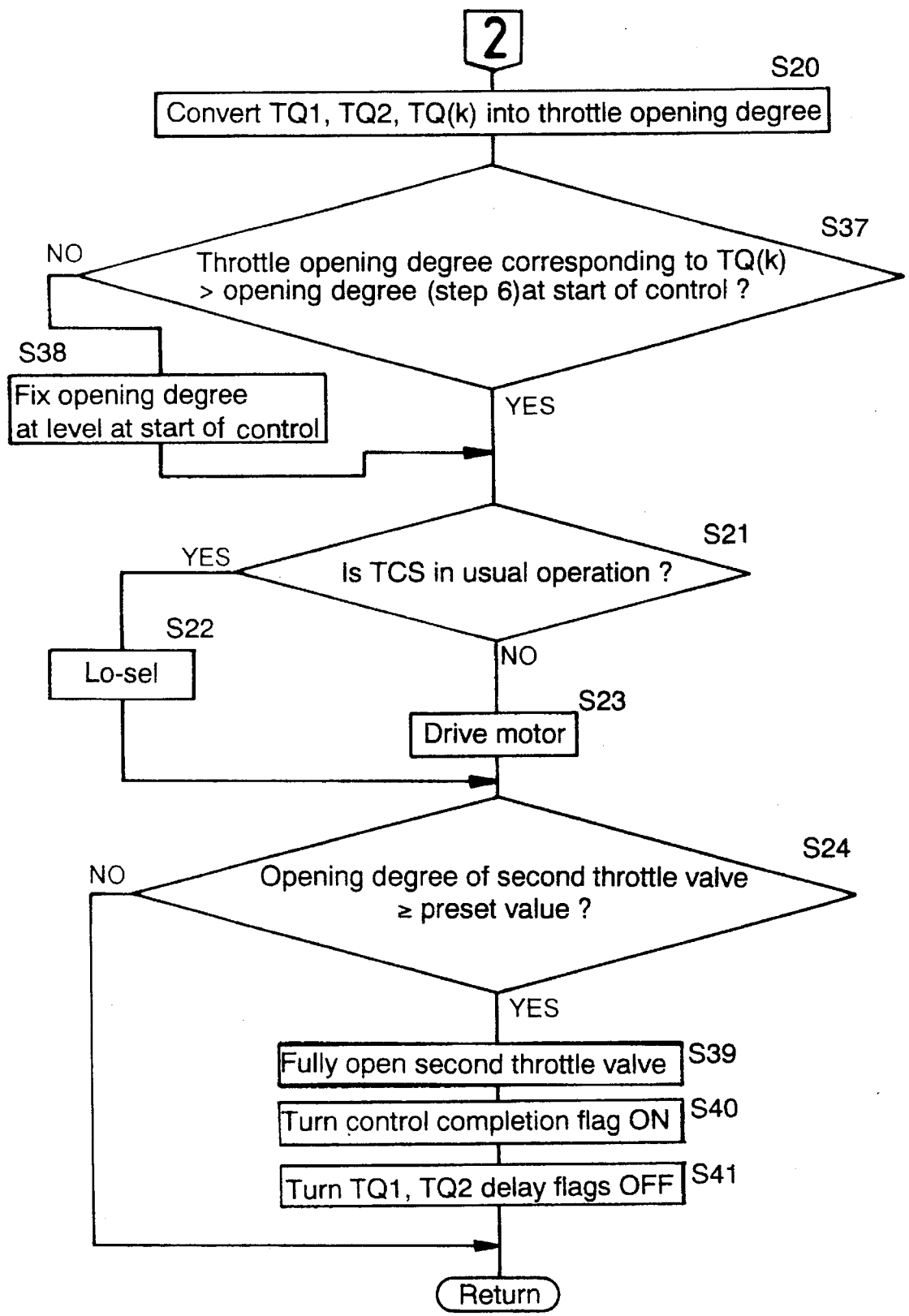
FIG. 5 is a third portion of the flow chart.

A control of driving force at the starting of the vehicle will be described with reference to the block diagram in FIG. 2 and the flow chart in FIGS. 3 to 5.

First, it is judged at Step S1 whether the entire driving force control system is functioning normally. If there is an abnormality, the processing is passed to a fail-safe routine at Step S2. Then it is judged at Step S33 whether a control-completion flag is in an ON state, and if not it is judged at Step S3 whether the traction control system is in an ON state. If traction control is ON, then at Step S4, it is judged whether a control-starting flag is in an ON state, and if not at Step S5, it is judged whether a shift position detected by the shift position sensor 6 indicates the transmission is in first gear. If the transmission is in first gear at Step S6, it is judged whether an accelerator opening degree $\theta th1$ detected by the accelerator opening degree sensor 3 is equal to or greater than a reference value THL, and if so at Step S7, it is judged whether a vehicle speed (RL+RR)/2 calculated as an average value of the follower wheel speeds detected by the follower wheel speed sensors $1_{RL}$ and $1_{RR}$, is equal to or less than a reference value VVL. If NO is determined at Step S33, YES is determined at Step S3, NO at Step S4, YES is determined at Step S5, YES is determined at Step S6 and YES is determined at Step S7, then it is determined that conditions for starting the control of driving force at the start of the vehicle have been established, and at Step S8, the control starting flag is turned ON.

When all of the conditions at Steps S5, S6 and S7 have been established and the control starting flag has just been turned ON, or when the control starting flag is already turned ON at Step S4, if the vehicle speed (RL+RR)/2 has exceeded the reference value VVL at Step S9, or if the accelerator opening degree $\theta th1$ is equal to or less than the reference value THL at Step S10, or if the shift position is other than first gear, at step S11 it is judged that the conditions for starting the control of driving force at the start of the vehicle have not been established. At Step S12, the control starting flag is turned OFF, and at Step S36, the control completion flag is turned OFF. When the control completion flag is in the ON state at Step S33, if the vehicle speed is equal to or less than the preset value at Step S34, or if the gear shift is other than in first gear at Step S35, the control starting flag is turned OFF at Step S12, and the control completion flag is turned OFF at Step S36.

When the control completion flag is turned OFF and the control starting flag is turned on to meet the conditions for starting control of the driving force at the start of the vehicle, the processing is passed to Step S13, at which the accelerator opening degree $\theta th1$ is read by the accelerator opening degree sensor 3, and the steering angle $\theta st$ is read by the steering angle sensor 5 at Step S14.

Then it is judged at Step S15 whether a TQ1 delay completion flag has been turned ON. The TQ1 delay completion flag is initially in an OFF state. As soon as the control delay starting flag has been turned ON, a timer starts counting. After a lapse of a TQ1 delay time (e.g., 60 m sec), the TQ1 delay completion flag is turned ON. A first loop after the control starting flag is turned ON, the TQ1 delay completion flag is in the OFF state and the answer at Step S15 is "NO". Therefore, the processing is advanced to Step S16, at which a control starting torque TQ1 is set.

Immediately after depression of the accelerator pedal 2, the accelerator opening degree $\theta th1$ is so small that it is difficult to detect a value thereof correctly. Therefore, until the accelerator opening degree $\theta th1$ becomes larger with passage of the TQ1 delay time so that an initial torque TQ2 which will be described can correctly be determined, the control starting torque TQ1 is used in place of the initial torque TQ2. Specifically, the control starting torque TQ1 is determined as a maximum torque when the steering angle $\theta st$ is 0 (zero) in an initial torque TQ2 map shown in FIG. 2. An excessive control can be prevented by using the control starting torque TQ1 in place of the initial torque TQ2 until the TQ1 delay time is lapsed.

If the TQ1 delay completion flag is OFF at Step S15, the control starting torque TQ1 is set at Step S16, and a TQ1 delay processing for controlling the opening degree of the second throttle valve 8 based on the control starting torque TQ1, is carried out at Step S17. If the TQ1 delay time has been lapsed at Step S18, a TQ1 delay completion flag is turned ON.

Subsequently, the control starting torque TQ1 is converted into the opening degree of the second throttle valve 8 at Step S20. If the traction control system is in operation at Step S21, the smaller of the opening degree of the second throttle valve 8 based on the traction control and the opening degree of the second throttle valve 8 based on the control starting torque TQ1 is selected at Step S22. The motor 9 for the second throttle valve 8 is driven at Step S23, so that the selected opening degree of the second throttle valve 8 is obtained. Then, until the opening degree of the second throttle valve 8 becomes equal to or greater than a predetermined value at Step S24, the processing is returned to Step S1.

If the opening degree of the second throttle valve 8 has become equal to or greater than the predetermined value at Step S24, the second throttle valve 8 is fully opened at Step S39. Then, the control completion flag is turned ON at Step S40, and the TQ1 delay flag and the TQ2 delay flag are turned OFF at Step S41, returning to Step S1.

If the answer at Step S15 becomes "YES" at Step S15 after lapse of the TQ1 delay time, it is judged at Step S25 whether a TQ2 delay completion flag has been turned ON. The TQ2 delay completion flag is initially in an OFF state. As soon as the TQ1 delay completion flag is turned ON, a timer starts counting, and if a TQ2 delay time (which will be described hereinafter) has elapsed, the TQ2 delay completion flag is turned ON. In a first loop after the TQ1 delay completion flag is turned ON, the TQ2 delay completion flag is in an OFF state and thus, the answer at Step S25 is "NO" and therefore, the processing is advanced to Step S26 at which an initial torque TQ2 is calculated.

Figure 2:
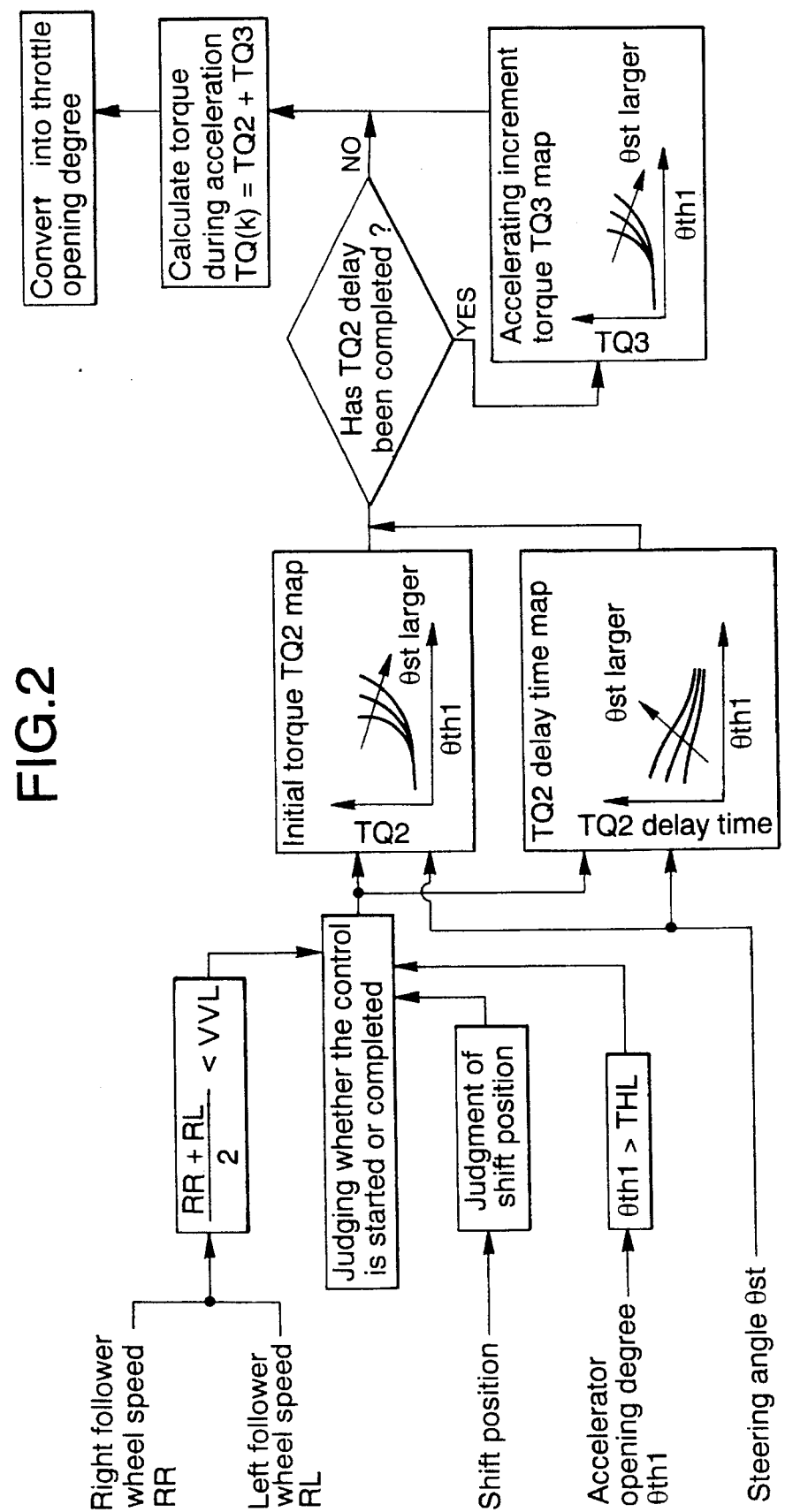
FIG. 2 is a block diagram of a control system of the present invention.

More specifically, at Step S26, the initial torque TQ2 is determined from the accelerator opening degree θth1 detected by the accelerator opening degree sensor 3 and the steering angle θst detected by the steering angle sensor 5 based on the initial torque TQ2 map shown in FIG. 2. The initial torque TQ2 is set at a value at which no suspension judder is generated on a wet asphalt road surface or the like. Then, at Step S27, a TQ2 delay time is determined from the accelerator opening degree θth1 and the steering angle θst based on the initial torque TQ2 map shown in FIG. 2. At Step S28, the TQ2 delaying processing for controlling the opening degree of the second throttle valve 8 based on the initial torque TQ2 is carried out. At Step S29, it is judged whether the TQ2 delay time has elapsed. If YES at Step 29, the TQ2 delay completion flag is turned ON at Step 30.

If the TQ2 delay completion flag is OFF at Step S25, the initial torque TQ2 is calculated at Step S26, and the TQ2 delay time is calculated at Step S27. Then, the TQ2 delaying processing for controlling the opening degree of the second throttle valve 8 based on the initial torque TQ2 is carried out at Step S28. If the TQ2 delay time has elapsed at Step S29, the TQ2 delay completion flag is turned ON at Step S30.

During the elapse of the TQ2 delay time, the motor 9 for the second throttle valve 8 is driven based on the initial torque TQ2 at Steps S20 to S23. At this time, the initial torque TQ2 has been set at the value at which no suspension judder is generated. Therefore, even if the accelerator pedal has been largely depressed immediately after start of the vehicle V, an increase in driven wheel torque can be suppressed to prevent any suspension judder and to provide a starting performance with a good-feeling and less vibration. Moreover, the initial torque TQ2 is calculated using the accelerator opening degree θth as a parameter and therefore, it is possible to correct the non-linearity of an engine output with respect to the accelerator opening degree θth and to establish arbitrary output characteristic which fits a driver's intention. In addition, since the initial torque TQ2 is calculated using the steering angle θst as a parameter, it is possible to distinguish between the straight travel and turning of the vehicle V to appropriately correct the driven wheel torque.

If the TQ2 delay completion flag is turned ON at Step S30, the processing is advanced to Step S31, at which an accelerating increment torque TQ3 is calculated. The accelerating increment torque TQ3 is determined from the accelerator opening degree θth1 and the steering angle θst based on the accelerating increment torque TQ3 map shown in FIG. 2. Then, at Step S32, a torque TQ(k) during acceleration (which will be referred to as a during-acceleration torque, hereinafter) is calculated by adding the initial torque TQ2 and the accelerating increment torque TQ3 to each other. At Steps S20 to S23, the motor 9 for the second throttle valve 8 is driven based on the during-acceleration torque TQ(k). If the throttle opening degree corresponding to the during-acceleration torque TQ(k) is equal to or less than the accelerator opening degree (at Step S6) at the start of the control at Step S37, the throttle opening degree corresponding to the during-acceleration torque TQ(k) is fixed at an accelerator opening degree at the start of the control at Step S38.

The value of the accelerating increment torque TQ3 is set such that the magnitude of the during-acceleration torque TQ(k) becomes a value which permits the vehicle V to be effectively accelerated without increasing the excessive slip of the driven wheels $W_{FL}$ and $W_{FR}$. Therefore, if a possibility of generation of suspension judder is eliminated after the lapse of the TQ2 delay time, the driven wheel torque can be increased by the during-acceleration torque TQ(k) to exhibit the accelerating performance of the vehicle V to the maximum.

If the opening degree of the second throttle valve 8 is equal to or more than the predetermined value at Step S24, the control of the driving force at the start is completed at Steps S39 to S41 and changed to a normal traction control.

Although the second throttle valve 8 of the tandem throttle valve arrangement has been employed as the means for limiting the driving force for the driven wheels $W_{FL}$ and $W_{FR}$ in the embodiment, a linkless throttle valve for electrically controlling the opening and closing of a single throttle valve in accordance with an accelerator opening degree and various parameters can be used in place of the tandem type second throttle valve. Further, an ignition-timing control device, a fuel injection amount control device, a braking-operation control device and/or the like can be used.

As discussed above, according the feature of the present invention, the driving force control system includes the operational state detecting means for detecting the operational state of the vehicle. The starting-state detecting means detects the starting-state of the vehicle, and the initial control quantity setting means sets the initial control quantity for the driving force at the start of the vehicle in accordance with the output from the operational state detecting means, when it is determined based on the output from the starting-state detecting means, that the vehicle is in the starting-state. Thus, the initial control quantity set by the initial control quantity setting means at the start of the vehicle is delivered to the driving force control means to limit the driving force for the driven wheel. Therefore, it is possible to prevent suspension judder from being generated due to an excessive driving force immediately after the start of the vehicle, thereby providing a starting performance with less vibration and a good feeling.

The limiting of the driving force for the driven wheel based on the initial control quantity, is continued until a predetermined time has lapsed after the start of the vehicle. Therefore, it is possible to effect the accurate control of the driving force over a period in which suspension judder is liable to be generated.

The driving force control system further includes an accelerating increment control quantity setting means for setting an accelerating increment control quantity which is added to the initial control quantity when accelerating the vehicle. Therefore, it is possible to enhance the accelerating performance of the vehicle.

The accelerating increment control quantity is added to the initial control quantity after the lapse of a predetermined time after the start of the vehicle. Therefore, it is possible to effectively reconcile the prevention of suspension judder and the enhancement in acceleration.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A driving force control system in a vehicle, comprising:
   (a) a slip detecting means for detecting the slip of a driven wheel of said vehicle;
   (b) a driving force control means connected to said slip detecting means for limiting the driving force on the driven wheel when said slip detecting means detects an excessive slip of the driven wheel;
   (c) an operational state detecting means for detecting an operational state of the vehicle;
   (d) a starting-state detecting means for detecting a starting-state of the vehicle;
   (e) an initial control quantity setting means connected to said operational state detecting means and said starting-state detecting means, for setting an initial control quantity for the driving force at the start of the vehicle in accordance with an output from said operational state detecting means, when it is determined, based on an output from said starting-state detecting means, that the vehicle is in a starting state, and wherein the initial control quantity set by said initial control quantity setting means at the start of the vehicle is applied to said driving force control means to limit the driving force on the driven wheel;
   limiting means for limiting of the driving force for the driven wheel based on said initial control quantity until a predetermined time has elapsed after the start of the vehicle; and
   an accelerating increment control quantity setting means for setting an accelerating increment control quantity which is added to the initial control quantity when the vehicle is accelerating after a predetermined time has elapsed after the start of the vehicle.

2. A driving force control system in a vehicle according to claim 1, including vehicle condition sensor means for sensing a plurality of vehicle operating conditions, the outputs of said vehicle condition sensor means being applied to said operational state detecting means, wherein the operating state of the vehicle is determined as a function of the outputs of said vehicle condition sensor means.

3. A driving force control system in a vehicle according to claim 2, wherein said vehicle condition sensor means includes driven wheel speed sensor means, follower wheel speed sensor means, accelerator opening degree sensor means, steering angle sensor means and shift position sensor means.

4. A driving force control system in a vehicle according to claim 1, wherein said initial control quantity setting means include means for generating a desired torque signal as a function of accelerator opening degree.

5. A driving force control system in a vehicle according to claim 4, wherein said means for generating a desired torque signal generates the signal after a predetermined elapsed time.

6. A driving force control system in a vehicle provided with an engine, comprising:
   (a) a slip detecting means for detecting the slip of a driven wheel of the vehicle;
   (b) an engine output control means connected to said slip detecting means for limiting an output from the engine when said slip detecting means detects an excessive slip of the driven wheel;
   (c) an operational state detecting means for detecting an operational state of the vehicle;
   (d) a starting-state detecting means for detecting a starting-state of the vehicle;
   (e) an initial control quantity setting means connected to said operational state detecting means and said starting-state detecting means, for setting an initial control quantity for the engine output at the start of the vehicle in accordance with an output from said operational state detecting means, when it is determined, based on an output from said starting-state detecting means, that the vehicle is in a starting state; and
   wherein the initial control quantity set by said initial control quantity setting means at the start of the vehicle is applied to said engine output control means to limit a driving force on the driven wheel.

7. A driving force control system in a vehicle according to claim 6, wherein said engine output control means limits the engine output based on the said initial control quantity until a predetermined time has elapsed after the start of the vehicle.

8. A driving force control system in a vehicle according to claim 7, further including an accelerating increment control quantity setting means for setting an accelerating increment control quantity which is added to the initial control quantity when the vehicle is accelerating.

9. A driving force control system in a vehicle according to claim 8, wherein the accelerating increment control quantity is added to the initial control quantity after the predetermined time has elapsed after the start of the vehicle.

10. A driving force control system in a vehicle according to claim 6, including vehicle condition sensor means for sensing a plurality of vehicle operating conditions, the outputs of said vehicle condition sensor means being applied to said operational state detecting means, wherein the operating state of the vehicle is determined as a function of the outputs of said vehicle condition sensor means.

11. A driving force control system in a vehicle according to claim 10, wherein said vehicle condition sensor means includes driven wheel speed sensor means, follower wheel speed sensor means, accelerator opening degree sensor means, steering angle sensor means and shift position sensor means.

12. A driving force control system in a vehicle according to claim 6, wherein said initial control quantity setting means include means for generating a desired torque signal as a function of accelerator opening degree.

13. A driving force control system in a vehicle according to claim 12, wherein said means for generating a desired torque signal generates the signal after a predetermined elapsed time.

* * * * *